(12) United States Patent
Greve

(10) Patent No.: US 6,895,582 B1
(45) Date of Patent: May 17, 2005

(54) METHOD AND APPARATUS FOR HIGH ASSURANCE COMPUTING USING VIRTUAL MACHINES ON GENERAL PURPOSE COMPUTING RESOURCES

(75) Inventor: David A. Greve, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 765 days.

(21) Appl. No.: 09/659,604

(22) Filed: Sep. 11, 2000

(51) Int. Cl.$^7$ .............................................. G06F 9/455
(52) U.S. Cl. .................................................. 718/1; 701/3
(58) Field of Search ...................... 718/1; 701/3; 709/1, 709/106, 310, 320, 100

(56) References Cited

U.S. PATENT DOCUMENTS

| | | | | |
|---|---|---|---|---|
| 5,761,477 A | * | 6/1998 | Wahbe et al. ................... | 709/1 |
| 5,761,625 A | * | 6/1998 | Honcik et al. ................. | 701/14 |
| 5,969,668 A | * | 10/1999 | Young, Jr. ................... | 342/357 |
| 6,151,618 A | * | 11/2000 | Wahbe et al. ................... | 709/1 |
| 6,317,872 B1 | * | 11/2001 | Gee et al. ....................... | 717/7 |
| 6,587,937 B1 | * | 7/2003 | Jensen et al. ................ | 711/173 |

OTHER PUBLICATIONS

Printed page of website address as follows: http://www.ajile.com, 2000.
Patent Application entitled "Method And System For Monitoring Microprocessor Integrity" filed on an even date, inventor D. Jensen and S. Koenck.

* cited by examiner

Primary Examiner—Meng-Al T. An
Assistant Examiner—George Lawrence Opie
(74) Attorney, Agent, or Firm—Nathan O. Jensen; Kyle Eppele

(57) ABSTRACT

A system and method for enhancing the integrity of an avionics system which uses a pair dissimilar general purpose microprocessors, each running a virtual machine, compiled for its respective processor, from a common original source file; the virtual machines running on a subset of the instructions for each microprocessor and thereby avoiding conditions known or likely to result in defects; the virtual machines running a single or identical avionics program and then voting the results of this simultaneous redundant execution to arrive at an enhanced assurance level; providing written claims to the FAA that an enhanced assurance level is achieved.

20 Claims, 2 Drawing Sheets

METHOD AND APPARATUS FOR HIGH ASSURANCE COMPUTING USING VIRTUAL MACHINES ON GENERAL PURPOSE COMPUTING RESOURCES

CROSS REFERENCE TO RELATED APPLICATION

The present invention relates to an application entitled "Method and System For Monitoring Microprocessor Integrity" by David W. Jensen and Steven E. Koenck, filed on even date herewith and assigned to a common assignee. The contents of such application are incorporated herein in their entirety by reference.

FIELD OF THE INVENTION

The present invention generally relates to computing, and more particularly relates to high assurance computing, and even more particularly relates to methods and systems for obtaining high assurance with commercially available general purpose computing resources.

BACKGROUND OF THE INVENTION

In recent years, especially in the area of avionics, multiple dissimilar general purpose microprocessor architectures have been used to attain a high level of assurance of integrity of general purpose microprocessor performance. These multiple processors are used in parallel, and their outputs are compared to reduce the likelihood of an undetected processor failure.

While these multiple dissimilar microprocessor architectures have been used extensively in the past, they do have some drawbacks. First of all, these architectures often use commercially available general purpose processors because of their relatively high performance and low cost. However, these processors, with their ever-increasing size, have increased capacity for bugs or defects. Therefore, with each increase in microprocessor size, which is heralded by the PC community, there is an actual reduction in assurance level. Additionally, when attempting to run the same program on dissimilar processors for avionics equipment, it is necessary to compile and maintain, over the service life of the product (which can often be in excess of thirty years), distinct versions for each of the dissimilar processors. This can be expensive.

Yet another drawback of dissimilar processors is the level of complexity typically involved in achieving communication between the dissimilar processors.

Consequently, there exists a need for economically efficient improved methods and systems for providing enhanced microprocessor integrity without the need for maintaining multiple versions of each of the various applications which run on the multiple processor system.

SUMMARY OF THE INVENTION

It is an object of the present invention to provide a system and method for economically enhancing the integrity of microprocessors.

It is a feature of the present invention to utilize a virtual machine, operating on a well-defined subset of the complete instruction set available to the microprocessor.

It is another feature of the present invention to use virtual machines on two dissimilar microprocessors.

It is an advantage of the present invention to limit, through the virtual machine abstraction layer, the set of instructions and/or the condition of their use in a microprocessor, and thereby increase assurance levels for the application and microprocessor combination.

It is another advantage of the present invention to achieve a "lingua franca" or common language, and thereby eliminate the need for multiple compiled versions of each application used on a multiple dissimilar processor architecture and the concomitant expenses associated therewith.

It is yet another advantage of the present invention to reduce processor interface complexity and to provide for fault tolerance in an efficient manner at a level below the application layer.

The present invention is an apparatus and method for enhancing the integrity of general purpose microprocessors which are designed to satisfy the aforementioned needs, provide the previously stated objects, include the above-listed features, and achieve the already articulated advantages. The present invention is carried out in a "multiple compiled application-less" manner in a sense that the need to compile multiple versions of each application used on multiple dissimilar microprocessors has been eliminated. Additionally, the present invention is carried out in a "comer case-less" system in the sense that the defects or bugs which can exist between unusual interactions between instructions or between instructions and asynchronous events (the "corner cases"), can be reduced, via the use of a virtual machine operating with a well-defined and verifiable subset of the complete instruction set for each microprocessor used. When "subset of complete instruction set" is used herein, it is intended to include the conditions of use of such instruction sets as well.

Accordingly, the present invention is an improved computing system and method including a virtual machine operated on a general purpose microprocessor with the intent of increasing the assurance level of the computing system.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
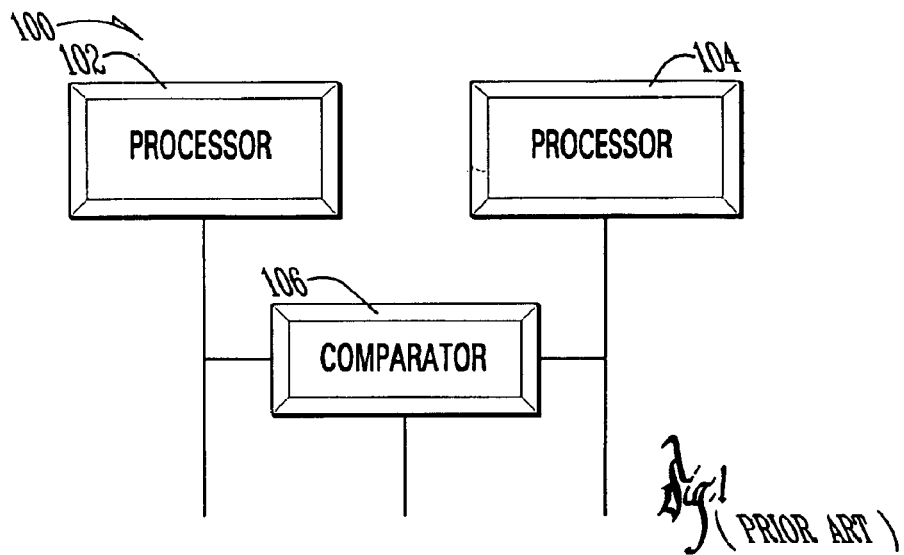
FIG. 1 is a block diagram view of a system of the prior art.

Now referring to the drawings wherein like numerals refer to like matter throughout, and more specifically referring to FIG. 1, there is shown a system of the prior art generally designated 100, including a first prior art general purpose commercially available microprocessor 102, such as an Intel Pentium microprocessor, a dissimilar second prior art general purpose commercially available microprocessor 104, such as a Motorola Power PC microprocessor and a comparator 106, for comparing outputs of first prior art general purpose commercially available microprocessor 102 and second prior art general purpose commercially available microprocessor 104, to determine they are the same and thereby determine that no faults have occurred. Each of the microprocessors 102 and 104 requires a distinct compiled version of each application to be run on the system 100.

Each of these compiled versions of the application run on the dissimilar microprocessors is capable of using every instruction set on such microprocessor, including bugs or defects, found in the "corner cases."

Figure 2:
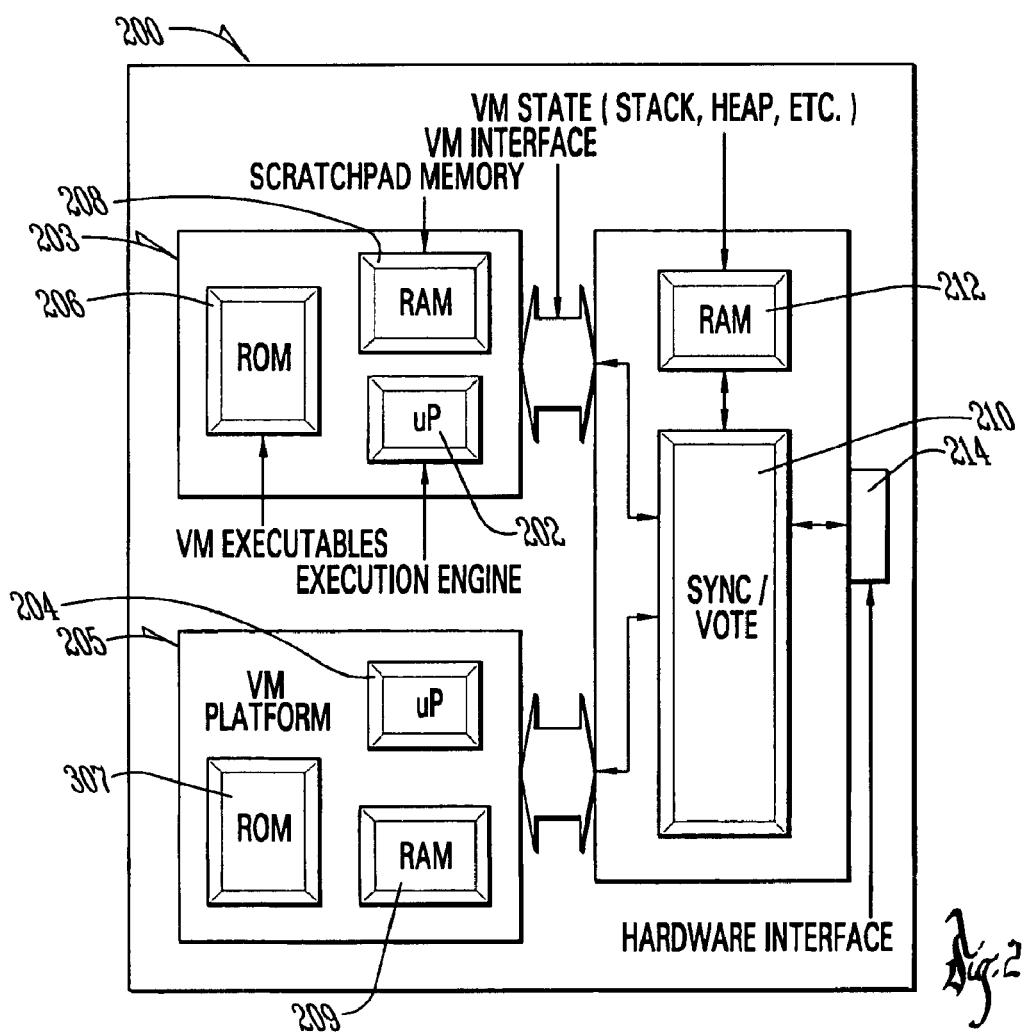
FIG. 2 is a block diagram view of a system of the present invention.

Now referring to FIG. 2, there is shown a simplified block diagram of a preferred embodiment of the present invention which can be an airborne avionics computing system, generally designated 200, including a general purpose commercially available microprocessor 202, such as, but not limited to, Intel Pentium processors, Motorola Power PC, TI DSPs, etc. The terms "general purpose" are used herein to refer to microprocessors which have a wide range of applicability and are not primarily designed for use in very limited and specific applications. The terms "commercially available" are used herein to refer to microprocessors which are available for purchase in commercial, wholesale, and retail markets in the U.S. While these processors have widespread acceptance in the industry, these processors also are susceptible to faults which can produce computational errors during normal operation.

Microprocessor 202 is shown disposed on a chip 203, which includes ROM 206 and RAM 208. The term "chip" as used throughout this specification may be a single chip or distributed across two or more devices. The ROM 206 may be used to store the code for the first virtual machine run on microprocessor 202. RAM 208 may be used for various well-known purposes, including scratchpad memory, etc. Of course, this is merely a preferred embodiment of the present invention, and various other approaches could be used as well. The most significant aspect of the present invention is that a first virtual machine is run on microprocessor 202. This first virtual machine then runs the avionics application thereon, on a well-defined, well-tested subset of the entire instruction set available on the microprocessor 202.

To address the diminution in integrity resulting from both known and latent faults, there is included a second high performance general purpose microprocessor 204, which is similar, but not the same make and model as microprocessor 202. Microprocessor 204 is shown disposed on a chip 205, containing ROM 207 and RAM 209, which may or may not be identical to ROM 206 and RAM 208 on chip 203. Microprocessor 204 contains a second virtual machine in ROM 207.

The first virtual machine and the second virtual machine could be identical except that they are compiled to run on the dissimilar microprocessors 202 and 204. In a preferred embodiment, the first and second virtual machines will be, in many ways, very similar to each other. However, due to the dissimilar processors upon which they run, they will operate on a dissimilar subset of instructions. Each virtual machine will operate on a subset of instructions which is well defined and well tested for their respective microprocessor.

Figure 3:
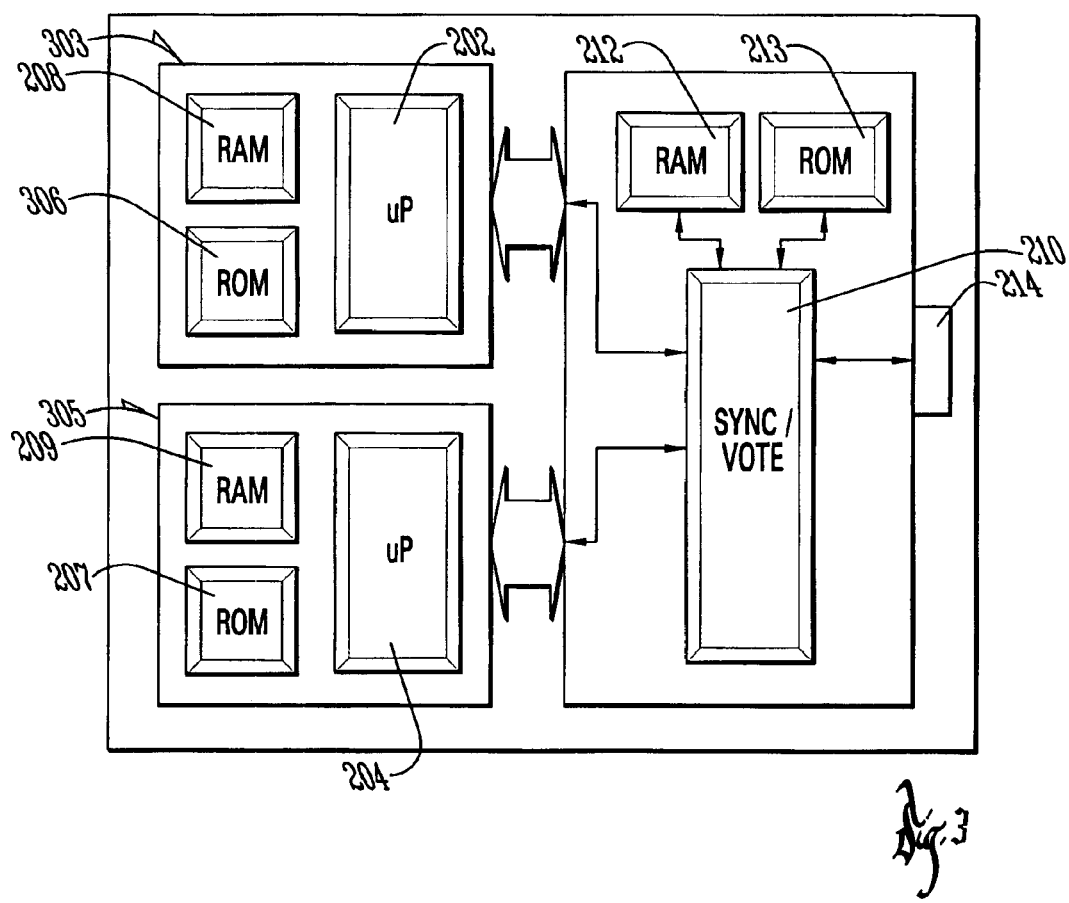
FIG. 3 is a block diagram view of an alternate embodiment of the present invention which includes single RAM and ROM memories shared by both microprocessors.

Second virtual machine executes, in a parallel fashion, preferably an identical avionics application, which is also run on first virtual machine of microprocessor 202. Said identical avionics application can be stored in ROM 206 for microprocessor 202 and in ROM 207 for microprocessor 204. Alternatively, as shown in an alternate configuration of FIG. 3, there is shown a first chip 303 having a microprocessor 202, RAM 208, and a ROM 306, for storing a first virtual machine. Also shown is a second chip 305 having a microprocessor 204, RAM 209, and a ROM 307 for storing a second virtual machine. The avionics application could be a single copy which is stored in ROM 213, depending on trade-offs made by the designer regarding performance and fault tolerance. Identical avionics application could be any type of avionics application, including but not limited to, flight management system applications, flight control computer applications, navigation equipment applications, etc.

The common instruction set of first and second virtual machines thus becomes a "lingua franca" or common language across the dissimilar microprocessors 202 and 204. The outputs of chips 203 and 205 are provided to sync/vote function 210, which. may be another microprocessor, a programmable logic device or any other device or combination of devices which can first sync up these outputs and then vote their results. Syncing/voting devices are well known in the prior art and are shown in FIG. 1 as comparator 106. When individually compiled applications are run directly on dissimilar processors, as is shown in FIG. 1, the comparator 106 is relatively complex. With the use of first and second virtual machines of the present invention, the outputs of microprocessors 202 and 204 are identical. However, these outputs may be skewed slightly over time, because of the dissimilar nature of microprocessors 202 and 204. One of the distinct advantages of the present invention is that some of the complexity (and, therefore, cost) of comparator 106 (FIG. 1) can be omitted from the Sync/Vote function 210, of the present invention. Finally, to attain improved assurance levels, these outputs are voted before they can modify the shared memory 212.

To assure that the outputs of microprocessor 202 and 204 do not diverge over time, a common source of input values for use by microprocessors 202 and 204 is provided through hardware interface 214. This input information is supplied through the sync/vote function 210 so as to provide each microprocessor 202 and 204 with the identical information at the same time.

A preferred method of designing and operating the system of the present invention is described below:

A first microprocessor 202 is provided.

A first FAA certified avionics application is provided.

A first virtual machine is executed on said microprocessor 202 and the first virtual machine executes said first FAA certified avionics application.

A first instruction subset of the first complete set of instructions available to the first microprocessor 202 is defined. This subset omits certain predetermined instructions which are known or likely to produce bugs and defects. The subset also omits certain predetermined instructions which are not essential to running the first virtual machine.

The first virtual machine with its first instruction subset is thoroughly tested and a first verifiable written claim of an improved level of assurance (with respect to use of the first microprocessor without a virtual machine) is made to the FAA for the first virtual machine.

A first certification of the first virtual machine is obtained from the FAA.

In a preferred embodiment, the process is repeated with a second microprocessor 204, second virtual machine, a second instruction subset, a second complete set of instructions, a second verifiable claim and a second certification.

The first and second microprocessors 202 and 204, respectively, are coupled through a synchronizing and voting function 210 before a change is made to shared memory 212.

Throughout this discussion, the terms "certified", "verified" or "determined" or variations of these terms, with respect to the FAA or agency of the U.S. government which regulates air safety shall mean any certification, verification or determination made by such agency irrespective of whether its official designation is the same. Any determination by such agency which follows any inquiry or inspection by said agency, shall be construed as being "certified", "verified" or "determined" by such agency.

While the present invention is believed to be most beneficial for use in aviation and areas regulated by the FAA, it is intended that the present invention could also be used in other areas which are under government regulation, such as, but not limited to nuclear energy and Nuclear Regulator Commission, automotive, rail, and their respective regulatory agencies, as well as OSHA regulations.

Similarly, the present invention is intended to include areas under the control of regulatory agencies of foreign countries and any non-governmental regulatory agency.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. A computing system comprising:
    a first general purpose microprocessor further comprising a first set of native processor instructions;
    a first random access memory coupled to said first general purpose microprocessor;
    a first virtual machine disposed in ROM, and executed by said first general purpose microprocessor,
    a first predetermined subset of said first set of native processor instructions, wherein instructions in said first predetermined subset are more likely to result in defects, in operation of said first general purpose processor when executed, than would a remaining subset of said first set of native processor instructions;
    a first implementation subset, which includes said first set of native processor instructions, except for said first predetermined subset; said first implementation subset is used by said first virtual machine; said first implementation subset does not include instructions for performing checks for potential erred execution of non-virtual machine application software; and,
    said first virtual machine has received a certification by the FAA, in response to a written claim of an improved assurance level, based, at least in part, upon a reduction in contents of said first implementation subset in relation to said first set of native instructions of said first microprocessor.

2. A system of claim 1 further comprising:
    a first FAA certified avionics application running on said first virtual machine.

3. A system of claim 2 further comprising:
    a second general purpose microprocessor which is dissimilar with respect to said first general purpose microprocessor;
    a second virtual machine executed by said second general purpose microprocessor; and,
    means for synchronizing and voting outputs of said first general purpose microprocessor and said second general purpose microprocessor.

4. A system of claim 3 wherein said second virtual machine executes said first FAA certified avionics application.

5. A system of claim 4 wherein said second virtual machine utilizes a second implementation subset, and said second virtual machine has received a certification by the FAA, in response to a written claim of an improved assurance level, based, at least in part, upon testing of said second implementation subset.

6. A system of claim 5 wherein said first and said second virtual machine are distinct compiled versions of an identical original virtual machine code.

7. A system of claim 6 wherein information is simultaneously provided to said first and said second general purpose microprocessors, via a single source of information.

8. A system of claim 7 wherein outputs of said first and second microprocessors have reduced temporal drift with respect to each other as a result of simultaneous receipt of information to be processed therein.

9. A system of claim 8 wherein said means for synchronizing and voting outputs is a programmable logic device.

10. A system of claim 9 wherein said means for synchronizing and voting outputs is a programmable logic device without functions therein for interfacing with more than one compiled avionics application program.

11. A computing system comprising:
    first means for processing a first native instruction set;
    second means for processing a second native instruction set, wherein said second native instruction set is dissimilar with respect to said first native instruction set;
    a first virtual machine operating on said first means for processing and generating first virtual machine outputs;
    a second virtual machine operating on said second means for processing and generating second virtual machine outputs;
    said first virtual machine and said second virtual machine being independently compiled applications originating from a single source application;
    a first application being executed simultaneously by said first virtual machine and said second virtual machine, without performing checks on errors caused by said first application and without distinguishing between safe and unsafe instructions for an instruction set of said first virtual machine; and
    means for voting said first virtual machine outputs and said second virtual machine outputs to arrive at final outputs which have a higher assurance level, with respect to said first virtual machine outputs and said second virtual machine outputs when examined independently.

12. A system of claim 11 further comprising means for simultaneously providing information to be processed, to said first and said second virtual machines.

13. A system of claim 12 further comprising a shared memory which is not independently accessible from first means for processing and said second means for processing.

14. A system of claim 13 wherein said means for voting is disposed between said shared memory and said first and said second means for processing.

15. A system of claim 14 wherein said first means for processing is a first general purpose microprocessor.

16. A system of claim 15 wherein said first and said second virtual machines have been certified by an FAA official.

17. A system of claim 16 wherein said first and said second virtual machines each utilize instruction subsets which are less inclusive than said first native instruction set and said second native instruction set, respectively.

18. A system of claim 17 wherein a written claim of higher assurance has been made to said FAA official, where the written claim has a component thereof which relies upon a reduction in content of one of said implementation subsets in comparison to a content of said first native instruction set.

19. A method for generating assurance information comprising the steps of:

providing a first general purpose microprocessor, for use on an aircraft, with a first virtual machine operating thereon;

providing a second general purpose microprocessor for use on an aircraft, with a second virtual machine operating thereon;

refraining from distinguishing between safe and unsafe instructions of said first virtual machine;

refraining from distinguishing between safe and unsafe instructions of said second virtual machine;

making a written claim to an FAA official, claiming that said first virtual machine operating on said first general purpose microprocessor results in an increased assurance level;

running an avionics application on said first and said second virtual machines and generating first and second outputs respectively, without performing checks for potential errors in said avionics application;

voting said first and said second outputs to arrive at assurance enhanced outputs with respect to said first and second outputs when examined independently;

making a claim to said FAA official that said assurance enhanced outputs have a higher assurance level than said first outputs; and, receiving a determination from said FAA official that said assurance enhanced outputs exceed predetermined assurance criteria.

20. A method of claim 19 wherein said avionics application is a flight management system application.

* * * * *